United States Patent
Kowoll

(10) Patent No.: US 8,562,698 B2
(45) Date of Patent: Oct. 22, 2013

(54) DEVICE FOR PRODUCTION OF SYNTHESIS GAS WITH A GASIFICATION REACTOR WITH A SUBSEQUENT QUENCHING SPACE

(75) Inventor: Johannes Kowoll, Bochum (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 127 days.

(21) Appl. No.: 12/736,253

(22) PCT Filed: Feb. 27, 2009

(86) PCT No.: PCT/EP2009/001396
§ 371 (c)(1), (2), (4) Date: Sep. 24, 2010

(87) PCT Pub. No.: WO2009/118082
PCT Pub. Date: Oct. 1, 2009

(65) Prior Publication Data
US 2011/0010992 A1    Jan. 20, 2011

(30) Foreign Application Priority Data

Mar. 27, 2008 (DE) .......... 10 2008 015 801
Nov. 14, 2008 (DE) .......... 10 2008 057 410
Jan. 21, 2009 (DE) .......... 10 2009 005 464

(51) Int. Cl.
   *C10J 3/72* (2006.01)
(52) U.S. Cl.
   USPC .......................................... 48/69
(58) Field of Classification Search
   USPC ................................. 48/62 R–62 A
   See application file for complete search history.

(56) References Cited

U.S. PATENT DOCUMENTS

| 4,369,045 A | 1/1983 | Vorres |
| 4,605,423 A | 8/1986 | Koog |
| 5,441,547 A | 8/1995 | Durrfeld et al. |
| 5,782,032 A | 7/1998 | Tanaka et al. |
| 2007/0079554 A1 | 4/2007 | Schingnitz et al. |
| 2008/0222955 A1* | 9/2008 | Jancker et al. ............ 48/67 |

FOREIGN PATENT DOCUMENTS

| DE | 40 25 955 | 1/1991 |
| DE | 10 2005 048 488 | 5/2007 |
| DE | 10 2006 029 595 | 12/2007 |
| EP | 0 099 833 | 2/1984 |
| EP | 0 400 740 | 12/1990 |

(Continued)

OTHER PUBLICATIONS

International Search Report.

*Primary Examiner* — Imran Akram
(74) *Attorney, Agent, or Firm* — Collard & Roe, P.C.

(57) ABSTRACT

The invention relates to a device for producing a crude gas containing CO or $H_2$ by gasification of an ash-containing fuel with oxygen-containing gas at temperatures above the fusion temperature of the ash in a gasification reactor and with a connected gas cooling chamber and a tapered connecting channel running from one chamber to the other. The aim of the invention is avoiding known problems and reducing the amount of fly ash and the amount of ungasified fuel, wherein a weak eddy is achieved in the inlet to the subsequent apparatuses in order to avoid deposits there with a very compact device, wherein the risk of solidification of the slag in the outlet is also avoided. The aim is achieved, wherein in the tapered connection channel (5) eddy reducing or eliminating wall surfaces (6) running over only a part of the cross-section of the connection channel are provided.

7 Claims, 6 Drawing Sheets

(56) References Cited

FOREIGN PATENT DOCUMENTS

Figure 1:
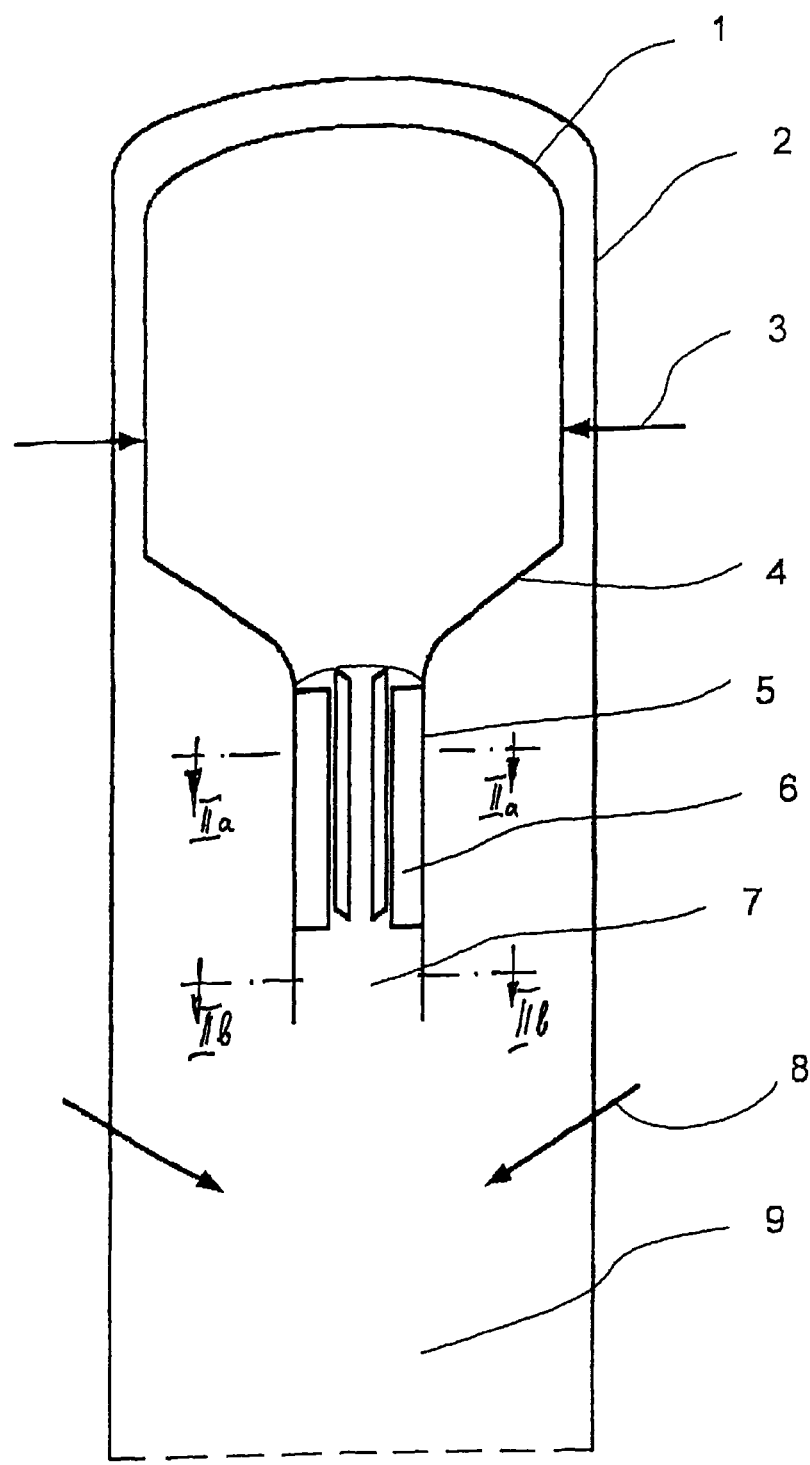

| EP | 0 431 266 | 6/1991 |
| EP | 0 616 022 | 9/1994 |
| EP | 0 699 734 | 3/1996 |
| WO | WO 2007/089254 | 8/2007 |

* cited by examiner

DEVICE FOR PRODUCTION OF SYNTHESIS GAS WITH A GASIFICATION REACTOR WITH A SUBSEQUENT QUENCHING SPACE

CROSS REFERENCE TO RELATED APPLICATIONS

This application is the National Stage of PCT/EP2009/001396 filed on Feb. 27, 2009, which claims priority under 35 U.S.C. §119 of German Application No. 10 2008 015 801.1 filed on Mar. 27, 2008, German Application No. 10 2008 057 410.4 filed on Nov. 14, 2008, and German Application No. 10 2009 005 464.2 filed on Jan. 21, 2009, the disclosures of which are incorporated by reference. The international application under PCT article 21(2) was not published in English.

The invention is directed at a device for production of raw gas that contains CO and $H_2$, by means of gasification of fuel that contains ash, with gas that contains oxygen, at temperatures above the melting temperature of the ash, in a gasification reactor, and with a subsequent gas cooling space and a transition channel that narrows from one space into the other.

Such devices are known, for example, from EP 0 616 022 B1 or EP 0 400 740 B1. A comparable design is also shown in DE 10 2005 048 488 A1, whereby EP 0 431 266 A1 or DE 10 2006 029 595 A1 should also be included among the state of the art.

In the case of gasifiers having a conventional design, 30 to 60% of the fuel ash is generally converted to flue ash, and this brings with it the disadvantages that deposits form in the raw gas path, and increased erosion of subsequent apparatuses can occur. The deposition and removal of flue ash are clearly more complicated and expensive than that of slag. Disposal of the flue ash is also more expensive, since heavy metals can be contained in parts of the flue ash, and furthermore this is generally fine dust that cannot be disposed of in the open.

EP 0 400 740 B, already mentioned above, shows a narrowed pipe with installations that can lead to congestion, and furthermore, the installations block the access to the spaces situated underneath them, for inspection and maintenance. The required cooling of the installations, which are similar to cross-hairs, furthermore leads to solidification of the slag, and this can lead to congestion.

EP 0 431 266 also has a high flue gas stream in the gasifier exit and poor fuel reaction in the gasifier, because part of the gases that are still reacting and contain carbon and ash flow out of the burner plane to the gasifier exit quickly and without deflection, since no spin is provided. It is known that a spin in the gasifier first deflects the gas streaming out of the burner plane against the wall, thereby causing part of the flue ash to be precipitated at the wall and the dwell time of the fuel particles in the gasifier to be extended.

It is also known that the stronger the spin, the more intensive the substance exchange in the gasifier. In this connection, stronger precipitation of the ash occurs. However, as already mentioned briefly above, a high spin in the gasifier exit causes difficulties in subsequent apparatuses, since the hot gases and slag particles are accelerated in the direction of the walls at a high tangential velocity. For this reason, only a slight spin is preferred in the gasifier, for example a firing angle of 3°.

This is where the invention takes its start, whose task consists not only of avoiding the disadvantages described above, but also of reducing the amount of flue ash and the amounts of the non-gasified fuels, whereby only a weak spin is supposed to be achieved in the entry of the subsequent apparatuses, in order to avoid deposits there, with a very compact device, whereby the risk of solidification of the slag in the run-out is not supposed to occur.

This task is accomplished, according to the invention, with a device of the type indicated initially, in that wall surfaces that reduce or prevent spin and pass through only a part of the cross-section of the transition channel are provided in the narrowed transition channel.

It has been shown that these wall surfaces, which are configured to be comparatively narrow, can optimally be used as spin brakes, without unnecessarily reducing the size of the passage cross-section of the transition channel.

Embodiments of the invention are evident from the dependent claims. In this connection, it can be provided that the wall surfaces are formed by cooling pipes. It has been shown in practice that even if the cooling pipes have a certain distance from one another, a closed wall rapidly forms because slag cakes on in certain regions, which wall reduces the spin or prevents it, to a great extent, all the way to the end of the transition channel.

In order to continue to fulfill this spin-braking function, it can be provided, in an embodiment of the invention, that the wall surfaces have a slightly twisted configuration in the longitudinal direction, where it is practical if these wall surfaces are oriented opposite the spin direction that prevails in the gasifier.

In addition, it can be provided, according to the invention, that a cooled groove that collects the slag is provided at the lower end, in the direction of gravity, of the wall surfaces, to drain the slag out of the quenching space.

In order to optimize passing out of the slag, it can furthermore be provided, according to the invention, that when there is a plurality of cooling pipes that form the wall surfaces, the lower pipe regions, in the direction of gravity, of adjacent pipes have a distance from one another, bridged by a collection crosspiece, whereby the collection crosspiece opens into the slag drain groove.

In an embodiment, the invention also provides that the diameter of the narrowed channel amounts to 0.1 to 0.5 of the gasifier diameter, whereby the clear width that remains in the interior, as a result of the vertical border edges of the spin-reducing walls, amounts to ≥500 mm. In this way, it is possible for a person to climb through this region in order to inspect the interior of the device.

Since spin is proportional to radius, it is greatly reduced by the surfaces situated in the edge zones. Depending on the desired weakening of the spin, the length of the spin-braking surfaces should amount to between 0.5 and 4 diameters of the connection channel.

Because of the "spin brake" according to the invention, it is possible to provide a firing angle of 5 to 10° with reference to the corresponding secant of the burner array, along with other spin bodies and installations for achieving increased circulation in the gasifier and thus intensive mixing, as the invention also provides.

The fuel reaction is increased by means of this measure, and caking of the ash particles is reinforced, thereby also improving the precipitation of these particles.

Finally, it is possible to continuously determine the heat flow from the balance of the cooling medium, and thus to calculate the slag density on the walls of the device, for example online, for which the following example is given:

cooling by means of evaporation of the boiler feed water in pipes of the device amount and temperature of the water fed into the device and the amount and pressure of the steam generated are measured. From this, the heat stream and the heat stream density are determined the average layer thickness of the solid slag is reciprocally dependent on the heat flow density, and can be approximately calculated with the following formula:

Layer thickness=lambda*$(T_F-T_K)/q$ where
lambda—heat conductivity of the slag
$T_F$—solidification temperature of the slag
$T_K$—boiling temperature of the slag With this method, online information is obtained concerning the layer thickness of the solid slag. If the layer is too thick, for example >50 mm, the amount of oxygen and thus the gasification temperature can be increased immediately. If, on the other hand, the heat flow density is too great, for example >200 kW/m³, then the amount of oxygen can be reduced, for example, or the amount of the moderation gas ($H_2O$ or $CO_2$) can be increased.

The slag precipitated on the gasifier walls predominantly flows off in the outer region of the device, thereby causing the slag layer to be particularly thick there and the heat flow density to be particularly low.

In contrast, the surfaces in the central region of the cross-section are hardly covered at all by slag that flows down, thereby causing only a thin slag layer to form on these surfaces. Separate measurements of the heat flow density in the outer region and on surfaces in the central region of the narrowed channel therefore yield two important data for control of the gasification temperature:

in the peripheral region, the thickest slag layer can be determined, in order to be able to protect the spin-braking installations from becoming blocked up with slag, by means of increasing the temperature, averaged over time, in the central region, the highest heat flow density is measured, whereby rapid changes in the heat flow density can be detected, in order to be able to quickly correct short-term changes in the gasification temperature.

In a further embodiment, it is provided, according to the invention, that the narrowed transition channel is equipped with a constriction having a drip edge, at its end that lies at the bottom in the direction of gravity.

With this measure, a number of additional advantages is achieved:

When the gas layers that flow in opposite directions are mixed, and when the gas is accelerated and its direction is changed, the slag particles that are present in the gas and are carried by it impact one another and cake together, thereby causing larger particles to be formed, which can be precipitated on the walls, so that the content of the ash particles in the gas is clearly reduced.

In an embodiment, the invention also provides that the constriction at the narrowed transition channel is additionally surrounded by another mixing pipe for forming an additional mixing space.

In this connection, it can be practical if the inside of the wall of the mixing pipe is configured to be metallic (cooled, but not stamped), something that is also provided according to the invention.

According to the invention, it can also be provided that the diameter of the additional mixing pipe and the distance of the free edge of the mixing pipe relative to the drip edge are adapted to the solidification behavior of the slag that occurs. If the slag solidifies suddenly at a high temperature, for example, such as at 1,200° C., for example, a smaller diameter can be selected, in order to minimize reflux of cold gas from the quenching region into the mixing space, and thus to prevent solidification of the slag at the drip edge. The lower the solidification temperature of the slag, the greater the diameter of the additional mixing pipe can be selected to be. At low solidification temperatures, more intensive reflux of the cold gas takes place, and the temperature in the mixing space becomes lower, so that no flue ash particles having a sticky surface adhere to the additional mixing pipe.

In this connection, it is practical if the ideally resulting expansion angle between drip edge, on the one hand, and the free end of the mixing pipe, on the other hand, lies in the range of 10° to 30°, whereby according to the invention, it is also provided that the radius of the additional mixing pipe is 0.1 to 1 m greater than the radius of the drip edge.

Additional characteristics, details, and advantages of the invention are evident from the following description and using the drawing. This shows, in FIG. 1 in a schematic representation, a pressurized container with reactor and quenching space, FIG. 2a a section, in a schematic representation, approximately along the line II-II in FIG. 1, FIG. 2b a section, in a schematic representation, approximately along the line IIb-IIb in FIG. 1, FIG. 3 a modified exemplary embodiment of the invention in the representation according to FIG. 1, FIG. 4 another exemplary embodiment of the invention, FIG. 5 a side and front view of a wall that directs flow, built into the transition channel from the reactor to the quenching space, as well as in FIG. 6 another exemplary embodiment of the invention in the representation according to FIG. 1.

In FIG. 1, a reactor 1 in a pressurized container 2 is shown in section, in a simplified representation, whereby the burners that impact the reactor 1 are merely indicated as arrows 3.

It is evident that the funnel-shaped gasifier bottom indicated with 4 makes a transition into a narrowed channel 5, which is provided with flow-directing installations 6 for reducing spin of the mixture that leaves the reactor.

In this connection, the narrowed channel 5 has a first mixing region 7 in the flow direction, behind the installations 6, which region then opens into the gas cooling space indicated with 9, for example a quenching space, whereby the feed of the quenching medium is indicated with arrows 8.

The flow-directing installations can be configured as pipe walls through which a cooling medium flows, as is described in greater detail below, making reference to FIG. 5. In addition, the walls can have studs and stamps on them, in order to facilitate bonding of the slag and to reduce the heat flow density.

Figure 2:
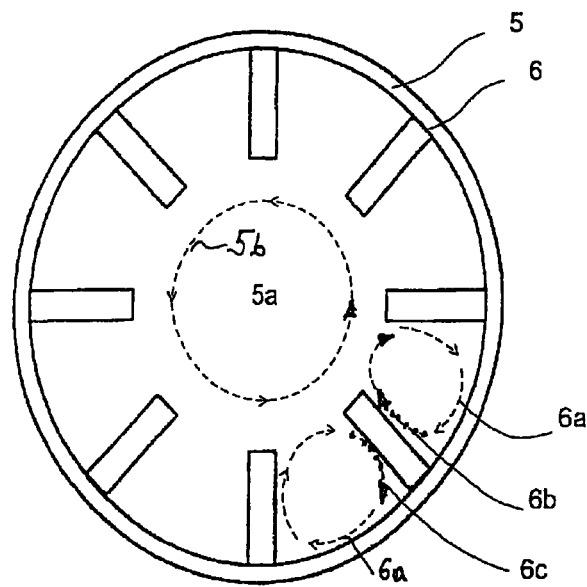
Figure 2:
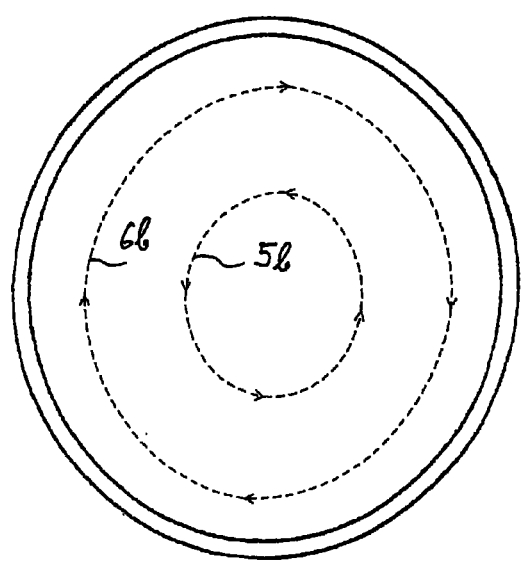

In FIG. 2a, it is indicated that the installations 6 according to FIG. 1 are directed radially inward, facing into the interior of the channel 5, whereby an inside cross-section indicated with 5a is kept free of installations. In this connection, this inside cross-section 5a is selected to be so great that a person can climb through it, in order to be able to perform maintenance work in the quenching space 9, for example.

The inside cross-section 5a is hardly cooled at all, thereby making it unnecessary to fear solidification of the slag and complete congestion.

In FIG. 2a, the spin movement of the flow that forms is furthermore indicated with broken arrows. In the spaces between the installations 6, spin flows 6a occur in the opposite direction of the flow in the interior that is free of installations, indicated with arrows 5b in FIG. 2a. The spin flows 6a between the installations 6 are directed in such a way that the circulation flows at the walls of the installations 6 are directed in the opposite direction, as indicated by the dotted arrow parts 6*b* and 6*c*. The partial regions of the flow 6*a* that face the interior are directed in the same direction as the rotation flow 5*b*.

If the installations are eliminated, the sectional drawing along the lines IIb-IIb in FIG. 1 shows that in this region, the flows 5*b* and 6*b* are directed in opposite directions, and brake one another reciprocally, and might have become completely dissolved at the lower end of the channel 5.

Figure 3:
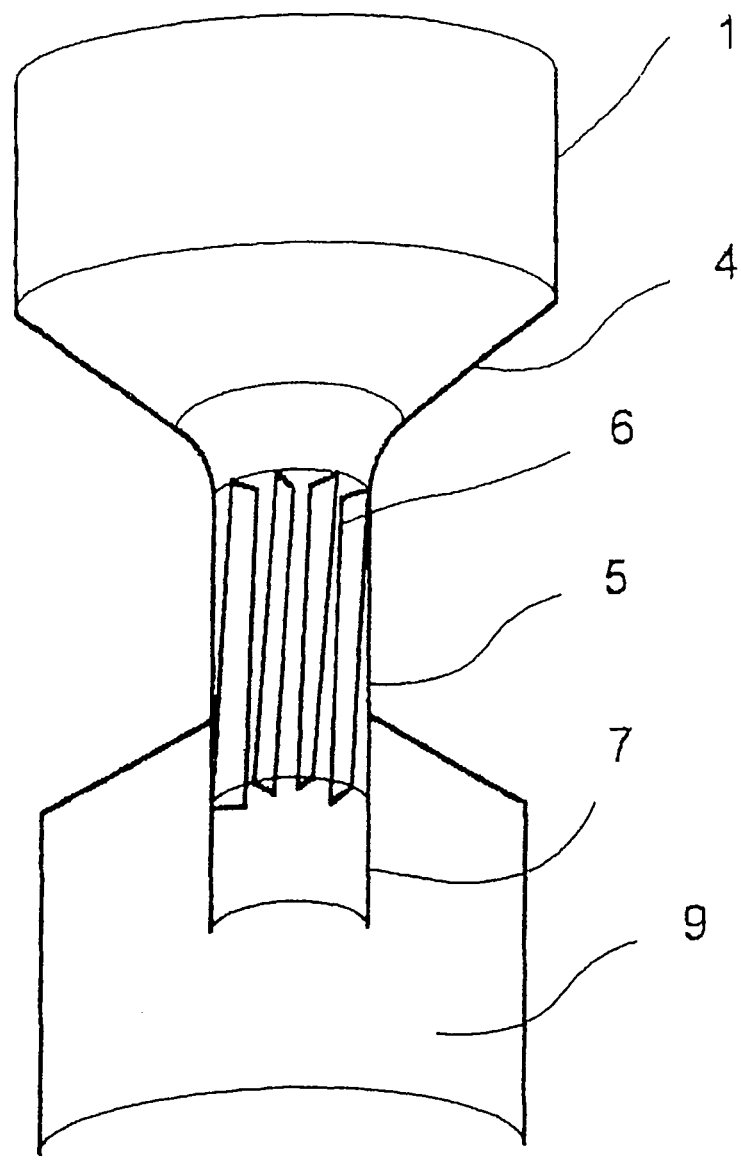
Figure 4:
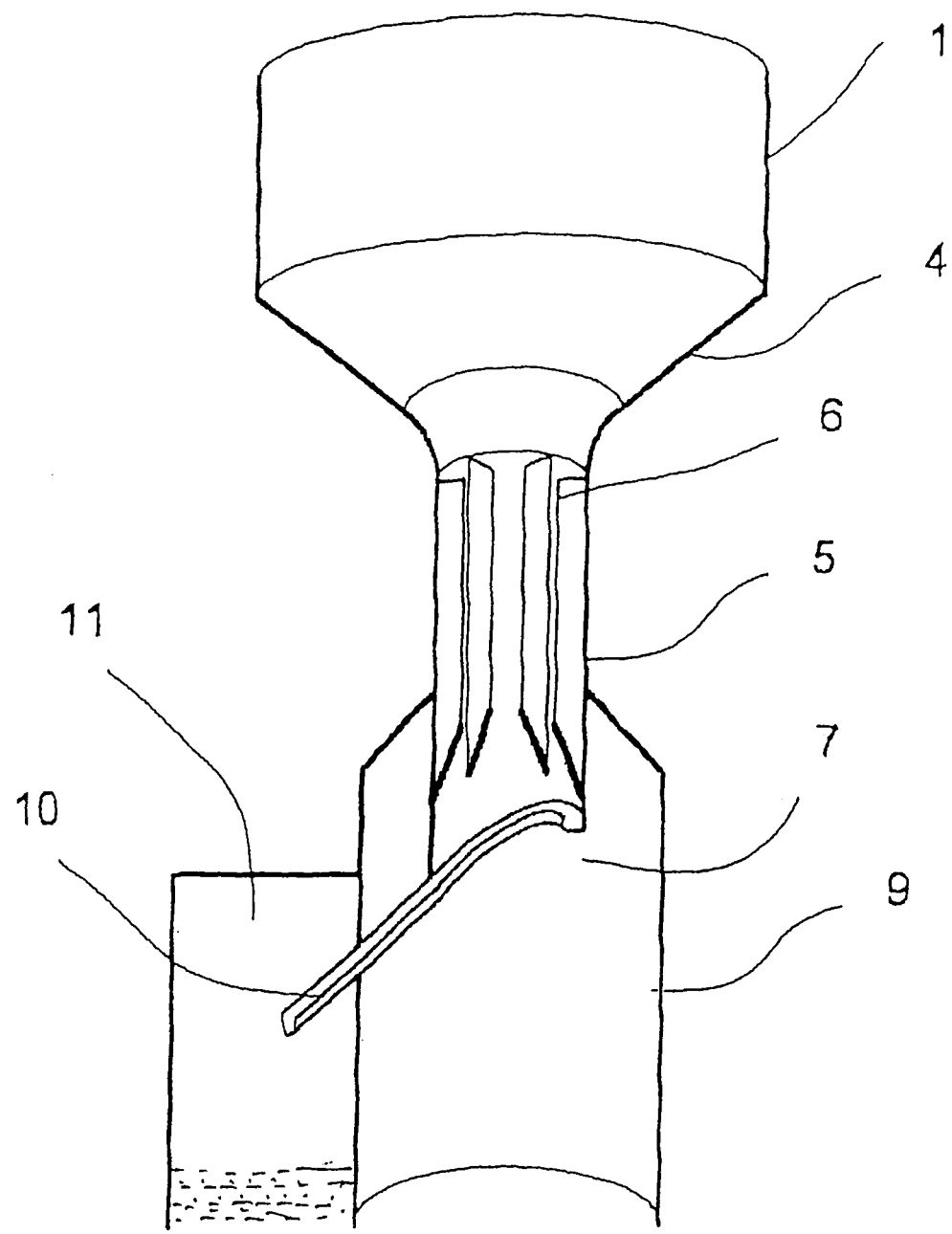

In FIG. 3, a modified exemplary embodiment is shown. Here, the quenching space 9 forms a separate component and is not part of the pressurized container, as it is in the example of FIG. 1.

In contrast to FIG. 1, in the exemplary embodiment of FIG. 3, the spin-reducing installations 6 are curved or set at a slant in the flow direction, specifically against the spin direction of the mixture that leaves the reactor 1.

In FIG. 4, once again, a modified exemplary embodiment is shown. Here, the lower edge of the narrowed channel is equipped with a collection groove, possibly cooled, for drawing off the liquid ash, whereby this collection groove, indicated as 10, opens into a separate space 11 with a slag bath. By means of draining the slag out by way of the cooled groove 10, into the slag bath space 11, the slag occurs separately and without fine solids, thereby making it possible to quench the gas that flows out of the channel 5 not only with water, but also with a colder gas, in order to thereby produce a hot drying gas, which can also be used as a reduction gas, for example.

In this connection, the pipe walls 6 can be configured with notches, ribs, or by means of a slanted position, in such a manner that the slag flows from their surface in the direction of the wall of the channel, in order to then be passed into the groove 10.

Figure 5:
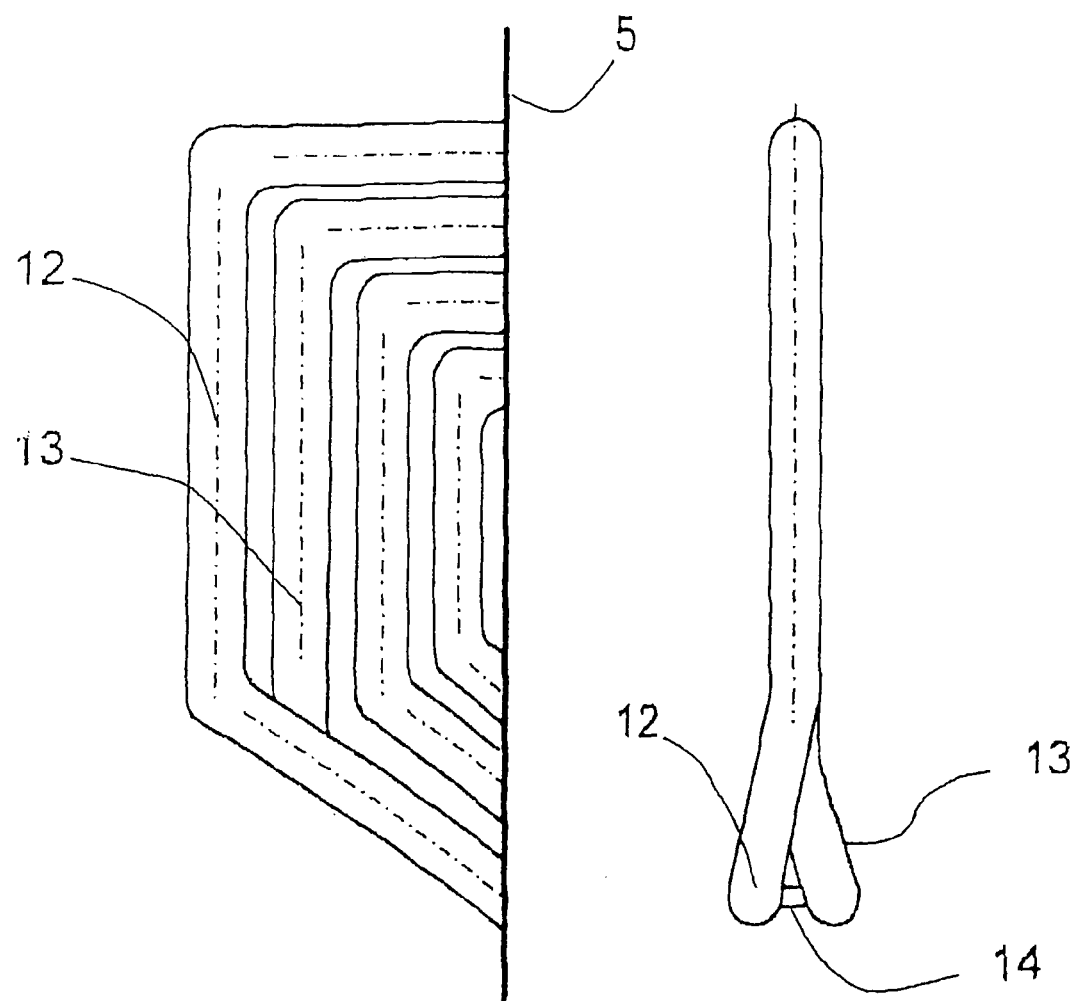

In FIG. 5, the configuration of such a spin-reducing wall is reproduced as an example. It consists of cooling pipes disposed next to one another, indicated with 12 and 13, whose lower region, in the direction of gravity, is set at a slant and at least partially spread apart, in such a manner that a crosspiece 14 can be positioned between the lower slanted pipes, in order to simplify flow of the slag there, which then flows in the direction of the pipe wall 6 and from there into a groove not shown in FIG. 5, if applicable, to be drained out, as described above.

Figure 6:
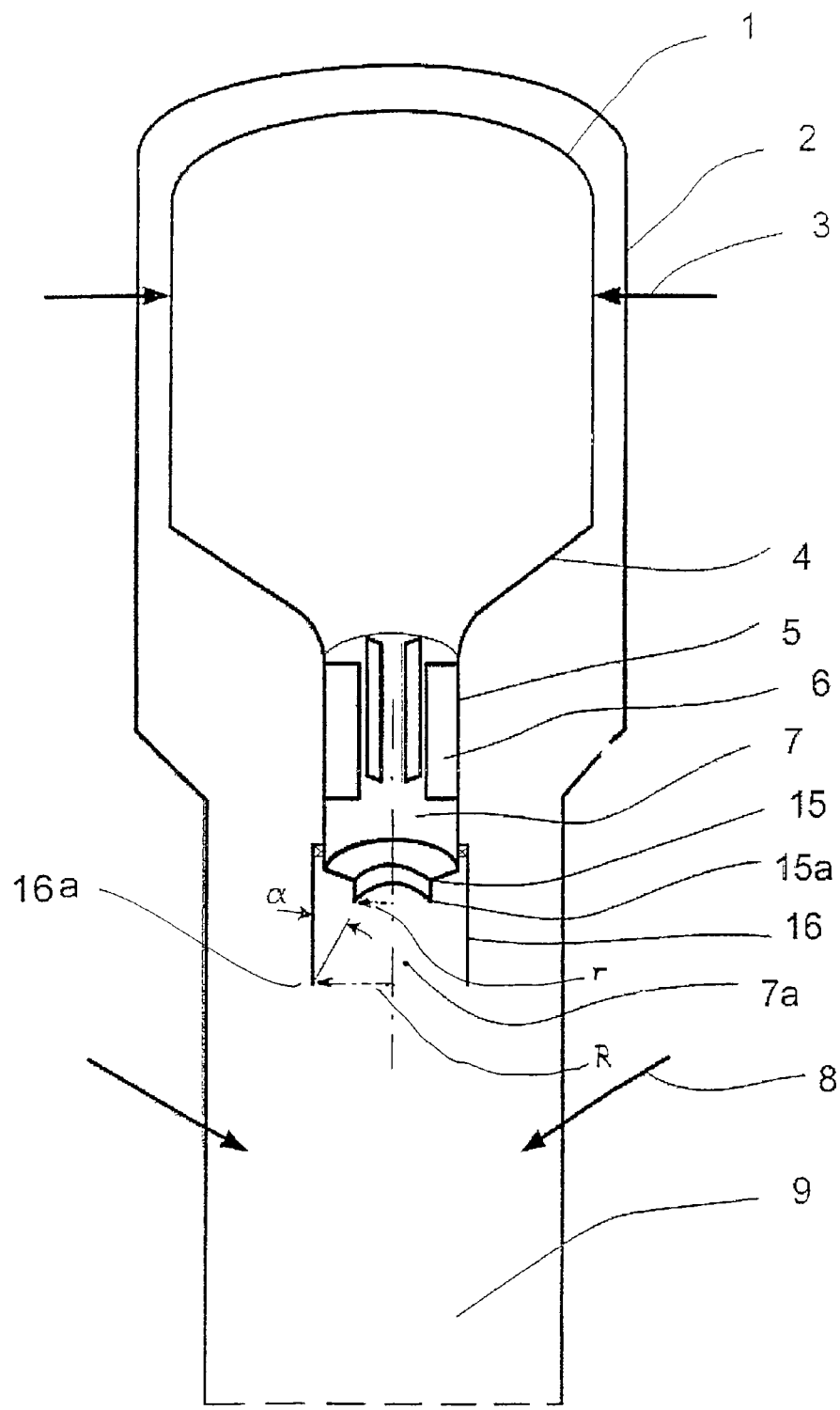

In FIG. 6, an example is shown with a shortened channel or mixing pipe 5, which is equipped, at its lower end in the direction of gravity, with a constriction 15 that has a drip edge 15*a*. By means of this constriction or narrowing 15, the opposite eddies 5*b* and 6*b* shown in FIG. 2*b* are forced to move toward one another, so that the effect that cancels itself out with the eddies is greatly increased in this way, so that a corresponding cancellation is practically present already at the end of the constriction or narrowing 15.

In the case of this exemplary embodiment of the invention, the exit opening or drip edge 15*a* is furthermore surrounded by an additional mixing pipe 16, which defines an additional mixing space 7*a*. This mixing pipe 16 also prevents reflux of the cold gas out of the quenching space 9 to the surroundings of the drip edge 15*a*, thereby excluding solidification of the slag and thus formation of stalactites or other hanging accruing contaminants in the cylinder.

In FIG. 6, the radius "r" of the drip edge 15*a* and the radius "R" of the additional mixing pipe 16 are also indicated by two broken arrows, along with an ideal angle "a" that results from the connecting line between drip edge 15*a* and free border edge 16*a* of the additional mixing pipe 16. The higher the solidification temperature of the slag, the smaller the angle $\alpha$ can be configured to be, and the lower the difference between r and R, whereby in practice, R can be about 0.1 to 1 m greater than r. It is practical if the angle $\alpha$ lies between 10° and 30°.

In order to form rays or strands of slag flows, the constriction 15 can furthermore have a corrugated surface, something that is not shown in any further detail here.

Of course, the exemplary embodiments of the invention that have been described can still be modified in many different respects, without departing from the basic idea.

This is particularly true for the symmetrical configuration of the cooled wall surfaces 6 in the transition channel 5. In an alternative type of gasifier, with a gas exit upward, through an exit opening in the ceiling, the narrowed transition channel is installed by way of this opening, and the slag precipitated on the surfaces of the channel flows or falls downward into the gasifier. Cooling of the gas in space 9 can take place by means of quenching, radiation, or convection. Reactive substances, for example limestone, can also be metered into the space, in order to remove sulfur compounds.

The invention claimed is:

1. An apparatus for production of raw gas that contains CO and $H_2$, by means of gasification of fuel that contains ash, with gas that contains oxygen, at temperatures above the melting temperature of the ash, comprising:
   a gasification reactor;
   a subsequent gas cooling space;
   a transition channel between the gasification reactor and the gas cooling space, the transition channel having a diameter that is less than a diameter of the reactor and the cooling space; and
   separate installations in the form of a plurality of cooling pipes provided in the transition channel, the installations being adapted to reduce or prevent spin of process gases, the installations passing through only a part of the cross-sectional area of the transition channel, to form a narrowed interior that is free of installations, the lengths of the installations being between 0.5 and 4 times the diameter of the transition channel,
   wherein the transition channel is equipped, at its lower end, in the direction of gravity, with a constriction having a drip edge,
   wherein the constriction is additionally surrounded, at the transition channel, by a mixing pipe having a free edge at a bottom end thereof, to form an additional mixing space,
   and wherein a resulting expansion angle between the drip edge and the free edge of the mixing pipe lies in the range of 10° to 30°.

2. Device according to claim 1, wherein the installations have a slightly twisted configuration in the longitudinal direction.

3. Device according to claim 1, wherein lower wall regions, in the direction of gravity, of adjacent pipes have a distance from one another that is bridged by a collection crosspiece, and wherein the collection crosspiece opens into the slag drain groove.

4. Device according to claim 1, wherein the diameter of the transition channel amounts to 0.1 to 0.5 of the gasifier diameter, whereby the clear width that remains in the interior, as a result of the vertical border edges of the spin-reducing walls, amounts to ≥500 mm.

5. Device according to claim 1, wherein a firing angle of 5 to 10° with reference to a corresponding secant of a burner array is provided, along with other spin bodies and installations, in order to achieve greater circulation in the gasifier and thus intensive mixing.

6. Device according to claim 1, wherein the inside of the wall of the mixing pipe is configured to be metallic (cooled but not stamped).

7. Device according to claim 1, wherein the radius of the additional mixing pipe is 0.1 to 1 m greater than the radius of the drip edge.

* * * * *